(12) United States Patent
Agrawal et al.

(10) Patent No.: US 9,661,450 B2
(45) Date of Patent: May 23, 2017

(54) NFC RECEIVER ARCHITECTURE WITH IMPROVED POWER SENSITIVITY

(71) Applicant: Texas Instruments Incorporated, Dallas, TX (US)

(72) Inventors: Abhishek Agrawal, Karnataka (IN); Yogesh Darwhekar, Karnataka (IN)

(73) Assignee: TEXAS INSTRUMENTS INCORPORATED, Dallas, TX (US)

( * ) Notice: Subject to any disclaimer, the term of this patent is extended or adjusted under 35 U.S.C. 154(b) by 0 days.

(21) Appl. No.: 15/041,966

(22) Filed: Feb. 11, 2016

(65) Prior Publication Data

US 2016/0165386 A1 Jun. 9, 2016

Related U.S. Application Data

(62) Division of application No. 14/186,029, filed on Feb. 21, 2014, now Pat. No. 9,292,721.

(60) Provisional application No. 61/771,399, filed on Mar. 1, 2013.

(51) Int. Cl.
*G06K 7/08* (2006.01)
*H04W 4/00* (2009.01)
*G06K 7/10* (2006.01)
*H04B 5/00* (2006.01)

(52) U.S. Cl.
CPC ........ *H04W 4/008* (2013.01); *G06K 7/10237* (2013.01); *H04B 5/0056* (2013.01)

(58) Field of Classification Search
CPC . G11C 5/147; G11C 11/4074; H01L 2924/00; H01L 2924/00014; H02M 3/158; H02M 3/156
USPC .................................. 235/439, 451
See application file for complete search history.

(56) References Cited

U.S. PATENT DOCUMENTS

| | | | |
|---|---|---|---|
| 4,711,368 A | | 12/1987 | Simons |
| 5,493,234 A | * | 2/1996 | Oh .......... G11C 5/147 326/33 |
| 6,163,706 A | * | 12/2000 | Rozenblit ............ H03F 1/0211 330/279 |
| 6,667,612 B2 | | 12/2003 | Duret |

* cited by examiner

*Primary Examiner* — Jamara Franklin
(74) *Attorney, Agent, or Firm* — Gregory J. Albin; Charles A. Brill; Frank D. Cimino

(57) ABSTRACT

An electronic communication device includes an antenna configured to receive a radio frequency (RF) signal and generate a differential current signal. A mixer circuit is configured to downconvert a differential voltage to generate an output voltage. The differential voltage is generated from the differential current signal, and the output voltage is used for detecting the RF signal.

20 Claims, 4 Drawing Sheets

NFC RECEIVER ARCHITECTURE WITH IMPROVED POWER SENSITIVITY

CROSS-REFERENCE TO RELATED APPLICATIONS

This application is a divisional of application Ser. No. 14/186,029 filed Feb. 21, 2014 and claims the benefit of Provisional Application Ser. No. 61/771,399 filed Mar. 1, 2013, the entireties of both of which are incorporated herein by reference,

TECHNICAL FIELD

Embodiments of the disclosure relate to near field communication (NFC) devices and more particularly to improved power sensitivity of NFC devices.

BACKGROUND

NFC is a 13.56 MHz carrier based secure communication technology that is used in personal ID, money transaction etc. An NFC system includes an NFC tag that contains information and an NFC reader that reads information from the NFC tag. An NFC tag can be a passive NFC tag or an active NFC tag. The passive NFC tag utilizes the magnetic field or radio frequency (RF) field generated by an NFC reader for operation. When the magnetic field of the NFC reader is incident on the antenna of the passive NFC tag, the tag harvests its power from incident magnetic field. A controller inside the passive NFC tag accesses its internal memory and modulates the incident magnetic field to provide information to the NFC reader. An active NFC tag generates its own magnetic field to interact with an NFC reader. It is to be noted that NFC communication technology works on the same principle as RF communication technology. Hence, the NFC devices (readers/tags) can interchangeably interact with RF devices (readers/tags).

A passive NFC device can communicate to a range of 50 mm, and the incident magnetic field or RF field or RF signal on the passive NFC device antenna can vary from 0.15 A/m to 12 A/m. Thus, the passive NFC device is required to detect RF field as high as 12 A/m and low RF fields in the range of 0.20 A/m and 0.15 A/m. However, the available passive NFC devices find it difficult to support such a large dynamic range of RF signal while maintaining low error rate. Thus, an NFC device is required that detects the incident signal at both high RF fields and low RF fields and at the same time maintains low bit error rate (BER).

SUMMARY

This Summary is provided to comply with 37 C.F.R. §1.73, requiring a summary of the invention briefly indicating the nature and substance of the invention. It is submitted with the understanding that it will not be used to interpret or limit the scope or meaning of the claims.

An embodiment provides an electronic communication device having an antenna configured to receive a radio frequency (RF) signal and generate a differential current signal at a first tag pin and a second tag pin. A first variable resistor is coupled to the first tag pin and a second variable resistor is coupled to the second tag pin. A mixer circuit is coupled across the first variable resistor and the second variable resistor and is configured to generate an output voltage. The output voltage is used for RF signal detection at all RF signal levels.

Another embodiment provides a method of detecting a received RF signal in an NFC device. A differential current signal is generated from the received RF signal. The differential current signal is converted to a differential voltage signal. The differential voltage signal is downconverted to generate an output voltage and the received RF signal is detected from the output voltage.

An example embodiment provides a computing device having a processor, a memory module and an electronic communication device. The electronic communication device further includes an antenna configured to receive a radio frequency (RF) signal and generate a differential current signal at a first tag pin and a second tag pin. A first variable resistor is coupled to the first tag pin and a second variable resistor is coupled to the second tag pin. A mixer circuit is coupled across the first variable resistor and the second variable resistor and is configured to generate an output voltage. The output voltage is used for RF signal detection at all RF signal levels.

Another embodiment provides an NFC device for detecting the presence of a field generated by a near field communication tag reader in a near field communication environment. The NFC device includes an antenna that is configured to receive a radio frequency (RF) signal and generate a differential current signal at a first tag pin and a second tag pin. A first variable resistor is coupled to the first tag pin and a second variable resistor is coupled to the second tag pin. A power harvest circuit and a shunt regulator are coupled to the first tag pin and the second tag pin. The shunt regulator is coupled in parallel to the power harvest circuit. A mixer circuit is coupled across the first variable resistor and across the second variable resistor and generates an output voltage. The output voltage is used for RF signal detection at all RF signal levels.

Other aspects and example embodiments are provided in the Drawings and the Detailed Description that follows.

BRIEF DESCRIPTION OF THE VIEWS OF DRAWINGS

DETAILED DESCRIPTION OF THE EMBODIMENTS

Figure 1:
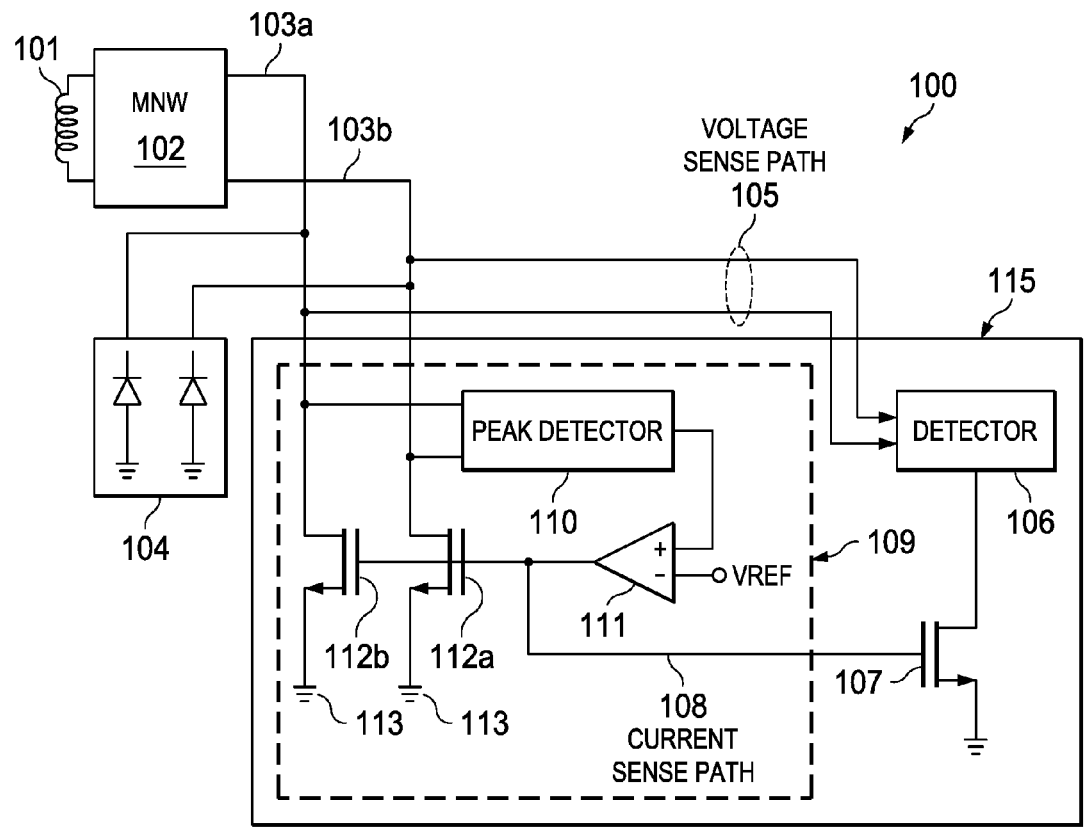
FIG. 1 illustrates a schematic of an electronic communication device according to an embodiment.

FIG. 1 illustrates a schematic of an electronic communication device 100 according to an embodiment. The electronic communication device 100 is one of RF (radio frequency) device, NFC (near field communication) device or any field communication device. The electronic communication device 100 includes an antenna 101. The antenna 101 is coupled to a matching network (MNW) 102 which is further coupled to a first tag pin 103a and a second tag pin 103b. A clamp circuit 104 is coupled to tag pins 103a and 103*b*. A differential voltage sense path 105 is coupled to the tag pins 103*a* and 103*b*. The differential voltage sense path 105 is coupled to a detector 106 which is coupled to a transistor 107. A shunt regulator 109 is also coupled to the tag pins 103*a* and 103*b*. In one embodiment, the shunt regulator 109 is any regulator known in the art. The shunt regulator 109 includes a peak detector 110 which receives signal from the tag pins 103*a* and 103*b*. A shunt amplifier 111 receives a reference voltage Vref and an output of the peak detector 110. An output of shunt amplifier 111 is connected to a plurality of shunt NMOS transistors 112*a* and 112*b*. The output of the shunt amplifier 111 is also provided to the transistor 107 through the current sense path 108. The plurality of shunt NMOS transistors 112*a* and 112*b* are coupled to the tag pins 103*a* and 103*b*. In one embodiment, the plurality of shunt NMOS transistors 112*a* and 112*b* are any of regulating devices known in the art. One terminal of the shunt NMOS transistors 112*a* and 112*b* is connected to the ground terminal 113. It is to be noted that the electronic communication device 100 contains other components such as RF filter, slicer, clock generator etc. which have not been illustrated for the sake of simplicity. An analog module 115 comprises the following analog circuits, but not limited to the shunt regulator 109 and detector 106.

The operation of the electronic communication device 100 illustrated in FIG. 1 is now explained. The antenna 101 receives a radio frequency (RF) signal from a neighboring device and generates a differential signal at the tag pins 103*a* and 103*b*. The neighboring device is one of RF device, NFC device or any field communication device. The matching network (MNW) 102 is a passive network that is used for impedance matching between the antenna 101 and the tag pins 103*a* and 103*b*. The clamp circuit 104 clamps the differential signal to remove the negative component of the differential signal. At low RF field, the detector 106 detects the RF signal through the differential voltage sense path 105. This is referred to as a voltage sense mode. The shunt regulator 109 provides overvoltage protection to the electronic communication device 100. The peak detector 110 is coupled to the tag pins 103*a* and 103*b* and detects the peak voltage of the RF signal. The shunt amplifier 111 receives the peak voltage signal from the peak detector 110. The shunt amplifier 111 compares the peak voltage with the reference voltage Vref. The shunt amplifier 111 output controls the resistance of the plurality of shunt NMOS transistors 112*a* and 112*b* by controlling the bias gate voltage of the plurality of shunt NMOS transistors 112*a* and 112*b*. At high RF field, the detector 106 detects the RF signal through the current sense path 108 and transistor 107. This is referred to as a current sense mode. The shunt regulator 109 regulates the peak voltage at the peak detector 110 within pre-defined limits.

Figure 2:
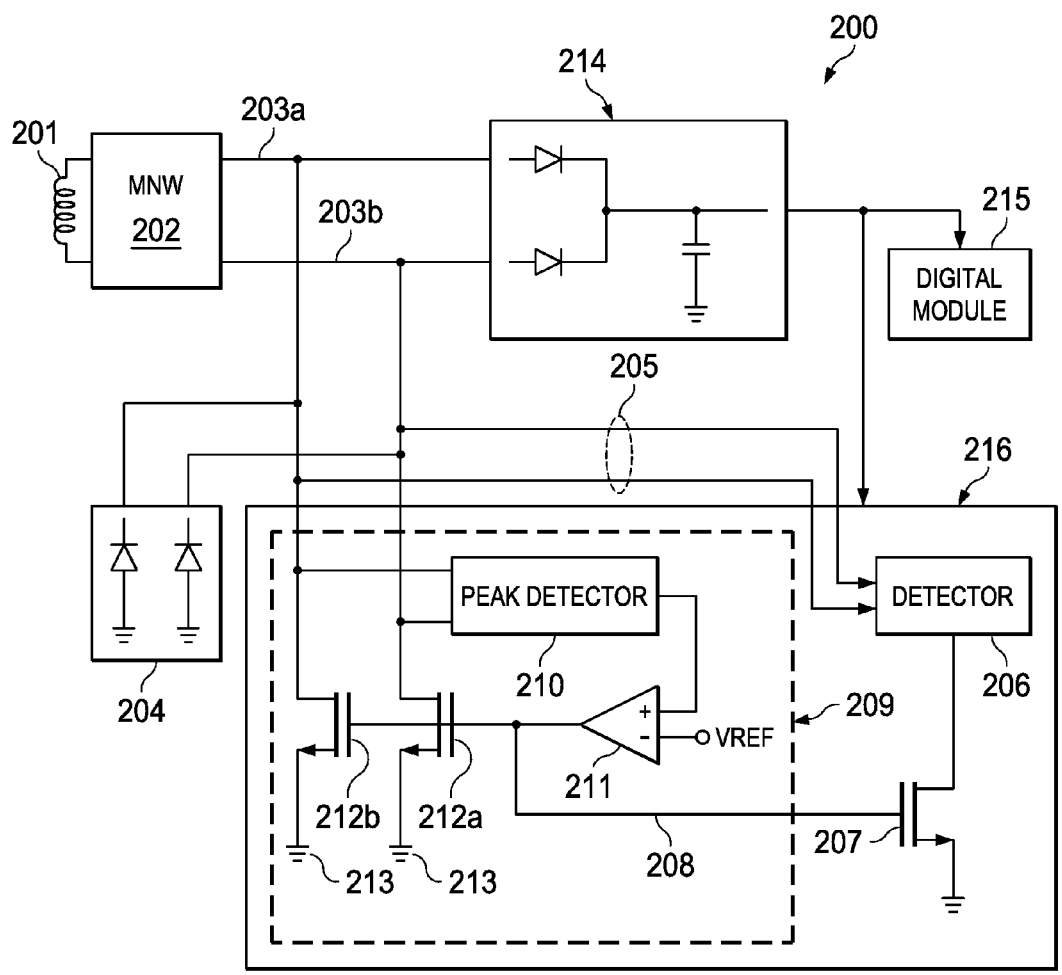
FIG. 2 illustrates a schematic of an electronic communication device according to another embodiment.

The RF signal/RF field incident on the antenna varies from 0.15 A/m to 12 A/m. To support such high dynamic range, the electronic communication device 100 works in voltage sense mode at low RF fields and current sense mode at high RF fields. At high RF field, the voltage at tag pins 103*a* and 103*b* gets saturated and electronic communication device 100 switches from the voltage sense mode to the current sense mode. However, in the intermediate RF field range, the RF field is enough to saturate the differential voltage sense path but not enough for detection across the current sense path as current through the current sense path has just build-up. This causes a deadzone in the reception and hence a significant increase in bit error rate (BER) in the intermediate RF field range. This is further illustrated and explained as a response curve A in FIG. 4 later in the specification FIG. 2 illustrates a schematic of an electronic communication device 200 according to another embodiment. The electronic communication device 200 is one of an RF (radio frequency) device, NFC (near field communication) device or any field communication device. The electronic communication device 200 includes an antenna 201. The antenna 201 is coupled to a matching network (MNW) 202 which is further coupled to a first tag pin 203*a* and a second tag pin 203*b*. A clamp circuit 204 is coupled to the tag pins 203*a* and 203*b*. A differential voltage sense path 205 is coupled to the tag pins 203*a* and 203*b*. The differential voltage sense path 205 is coupled to a detector 206 which is further coupled to a transistor 207. A shunt regulator 209 is also coupled to the tag pins 203*a* and 203*b*. In one embodiment, the shunt regulator 209 is any regulator known in the art. The shunt regulator 209 includes a peak detector 210 which receives signal from the tag pins 203*a* and 203*b*. A shunt amplifier 211 receives a reference voltage Vref and an output of the peak detector 210. An output of shunt amplifier 211 is connected to a plurality of shunt NMOS transistors 212*a* and 212*b*. The output of the shunt amplifier 211 is also provided to the transistor 207 through the current sense path 208. The plurality of shunt NMOS transistors, 212*a* and 212*b* are coupled to the tag pins 203*a* and 203*b*. In one embodiment, the plurality of the shunt NMOS transistors 212*a* and 212*b* are any of regulating devices known in the art. One terminal of the plurality of shunt NMOS transistors 212*a* and 212*b* is connected to the ground terminal 213. It is to be noted that the electronic communication device 200 contains other components such as RF filter, slicer, clock generator etc. which have not been illustrated for the sake of simplicity. A power harvest circuit 214 is coupled to the tag pins 203*a* and 203*b*. The power harvest circuit 214 is coupled to a digital module 215 and an analog module 216. The digital module 215 includes following digital circuits, but not limited to, memory and processors. The analog module 216 includes the following analog circuits, but not limited to the shunt regulator 209 and detector 206.

The operation of the electronic communication device 200 illustrated in FIG. 2 is now explained. The antenna 201 receives a radio frequency (RF) signal from a neighboring device and generates a differential signal at the tag pins 203*a* and 203*b*. The neighboring device is one of RF device, NFC device or any field communication device. The matching network 202 is a passive network that is used for impedance matching between the antenna 201 and the tag pins 203*a* and 203*b*. The clamp circuit 204 clamps the differential signal to remove the negative component of the differential signal. At low RF field, the detector 206 detects the RF signal through the differential voltage sense path 205. This is referred to as a voltage sense mode. The shunt regulator 209 provides overvoltage protection to the electronic communication device 200. The peak detector 210 is coupled to the tag pins 203*a* and 203*b* and detects the peak voltage of the RF signal. The shunt amplifier 211 receives the peak voltage signal from the peak detector 210. The shunt amplifier 211 compares the peak voltage with the reference voltage Vref. The shunt amplifier 211 output controls the resistance of the plurality of shunt NMOS transistors 212*a* and 212*b* by controlling the bias gate voltage of the plurality of shunt NMOS transistors 212*a* and 212*b*. At high RF field, the detector 206 detects the RF signal through the current sense path 208 and transistor 207. This is referred to as a current sense mode. The shunt regulator 209 regulates the peak voltage at the peak detector 210 within pre-defined limits. The power harvest circuit 214 provides current to the digital module 215 and the analog module 216 since there is no battery supply.

The incident RF signal on the antenna 201 generates a differential current at the tag pins 203a and 203b. The incoming current is divided between the power harvest circuit 214 and the shunt regulator 209. The power harvest circuit 214 is connected in parallel with the shunt regulator 209. At high RF field, the electronic communication device 200 works in the current sense mode. The shunt regulator 209 regulates the differential current that is generated at the tag pins 203a and 203b within pre-defined limits. The power harvest circuit 214 receives incoming current from the tag pins 203a and 203b based on the power requirements of the digital module 215 and the analog module 216. As the power harvest circuit 214 supplies current to many digital circuits and analog circuits, the signature of this incoming current becomes noisy. Hence, the current provided to the shunt regulator 209 also becomes noisy, which reduces the SNR (signal to noise ratio) of the received RF signal. In addition, when current generated at the tag pins 203a and 203b is equal to the current required by the power harvest circuit 214, the detector 206 receives no current through the shunt regulator 209. This limits the sensitivity of the RF signal reception.

Figure 3:
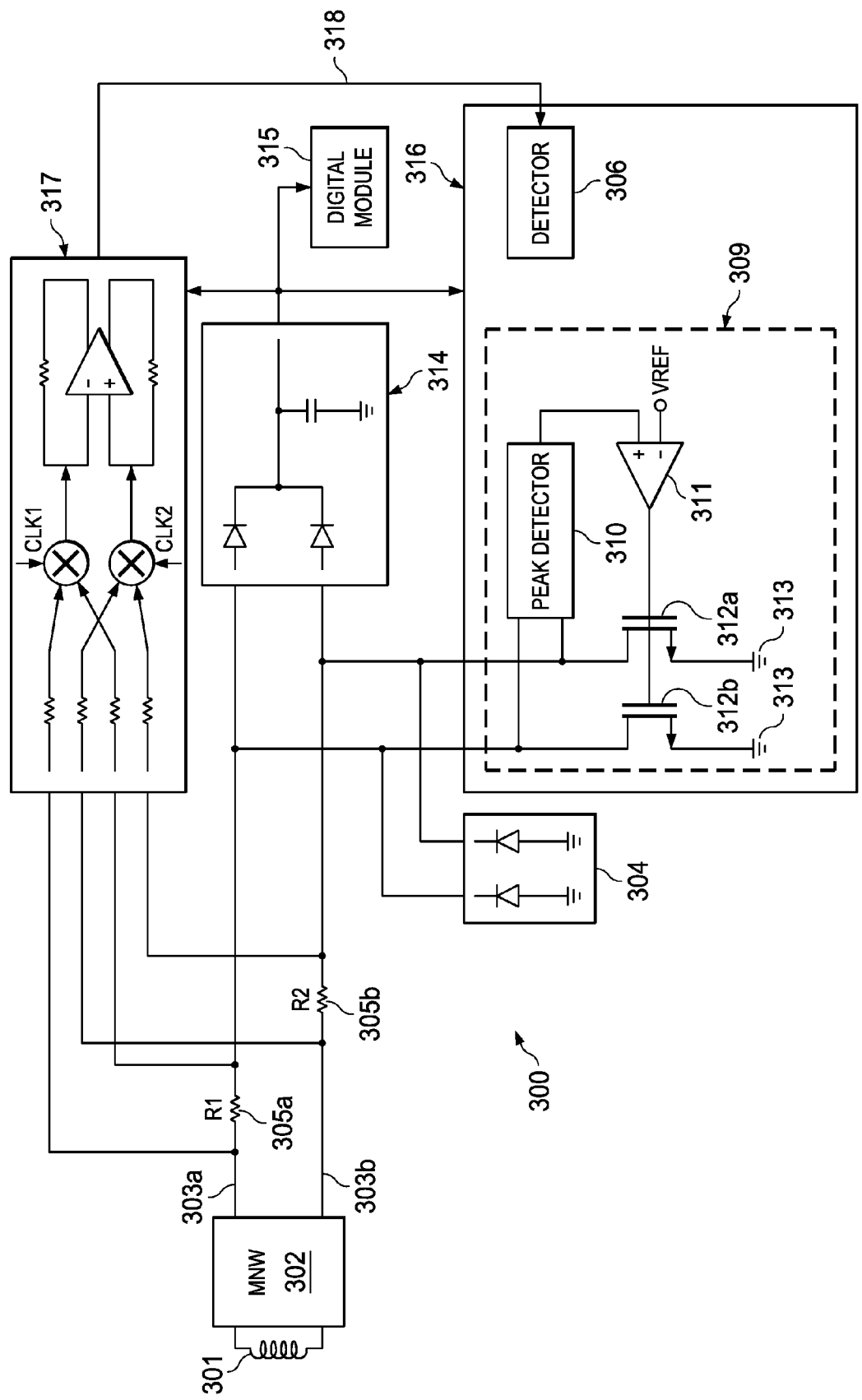
FIG. 3 illustrates a schematic of an electronic communication device according to another embodiment.

FIG. 3 illustrates a schematic of an electronic communication device 300 according to another embodiment. The electronic communication device is one of RF (radio frequency) device, NFC (near field communication) device or any field communication device. The electronic communication device 300 includes an antenna 301. The antenna 301 is coupled to a matching network (MNW) 302 which is further coupled to a first tag pin 303a and a second tag pin 303b. A first variable resistor R1 305a is coupled to the first tag pin 303a and a second variable resistor R2 305b is coupled to the second tag pin 303b. A clamp circuit 304 is coupled to the first variable resistor R1 305a and the second variable resistor R2 305b. A shunt regulator 309 is also coupled to the first variable resistor R1 305a and the second variable resistor R2 305b. In one embodiment, the shunt regulator 309 is any regulator known in the art. The shunt regulator 309 includes a peak detector 310 which receives signal from the first variable resistor R1 305a and the second variable resistor R2 305b. A shunt amplifier 311 receives a reference voltage Vref and an output of the peak detector 310. An output of shunt amplifier 311 is connected to a plurality of shunt NMOS transistors 312a and 312b. The plurality of shunt NMOS transistors 312a and 312b are coupled to the first variable resistor R1 305a and the second variable resistor R2 305b. In one embodiment, the plurality of shunt NMOS transistors 312a and 312b are any of regulating devices known in the art. One terminal of the plurality of shunt NMOS transistors 312a and 312b is connected to the ground terminal 313. A mixer circuit 317 is connected across the first variable resistor R1 305a and the second variable resistor R2 305b. In one of the embodiments, the mixer circuit 317 is a passive mixer. The mixer circuit 317 is coupled to the detector 306 through signal path 318. It is to be noted that the electronic communication device 300 contains other components such as RF filter, slicer, clock generator etc. which have not been illustrated for the sake of simplicity. A power harvest circuit 314 is coupled to the first variable resistor R1 305a and the second variable resistor R2 305b. In one of the embodiments, the power harvest circuit 314 is a half wave rectifier. The power harvest circuit 314 is coupled to a digital module 315, an analog module 316 and the mixer circuit 317. The digital module 315 includes following digital circuits, but not limited to, memory and processors. The analog module 316 includes the following analog circuits, but not limited to, shunt regulator 309 and detector 306.

Figure 4:
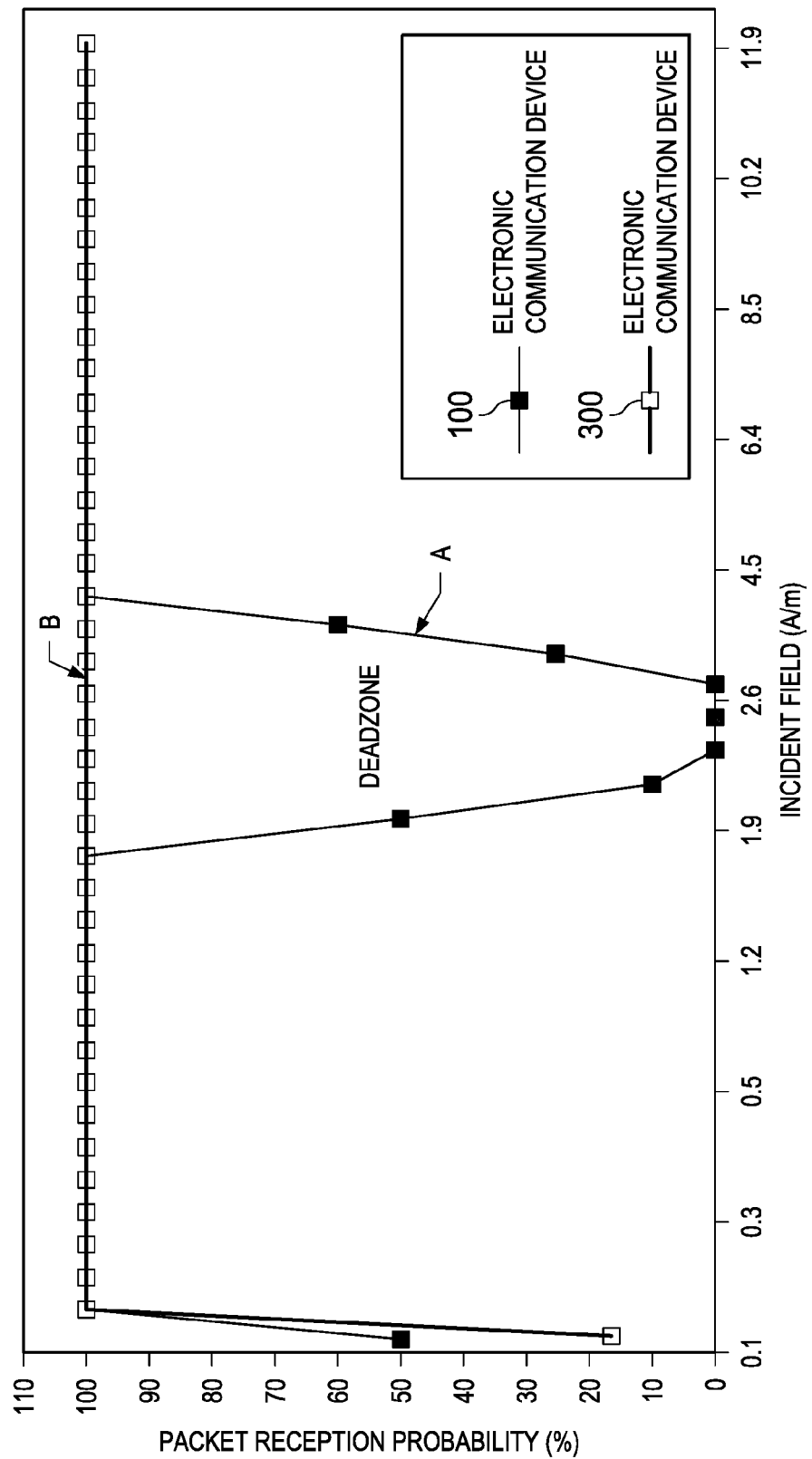
FIG. 4 illustrates the response of the electronic communication device illustrated in FIG. 1 and the electronic communication device illustrated in FIG. 3 to the incident radio frequency (RF) signal/RF field, according to an embodiment.

The operation of the electronic communication device 300 as illustrated in FIG. 3 is now explained. The antenna 301 receives a radio frequency (RF) signal from a neighboring device and generates a differential current signal at the tag pins 303a and 303b. The neighboring device is one of RF device, NFC device or any field communication device. The matching network (MNW) 302 is a passive network that is used for impedance matching between the antenna 301 and the tag pins 303a and 303b. The clamp circuit 304 clamps the differential current signal to remove the negative component of the differential current signal. The shunt regulator 309 provides overvoltage protection to the electronic communication device 300. The peak detector 310 is coupled to the first variable resistor R1 305a and the second variable resistor R2 305b and detects the peak voltage of the RF signal. The shunt amplifier 311 receives the peak voltage signal from the peak detector 310. The shunt amplifier 311 compares the peak voltage with the reference voltage Vref. The shunt amplifier 311 output controls the resistance of the plurality of shunt NMOS transistors 312a and 312b by controlling the bias gate voltage of the plurality of shunt NMOS transistors 312a and 312b. The shunt regulator 309 regulates the peak voltage at the peak detector 310 within pre-defined limits. The power harvest circuit 314 provides current to the digital module 315, the analog module 316 and to the mixer circuit 317 since there is no battery supply. The differential current signal generated at the tag pins 303a and 303b passes through the first variable resistor R1 305a and the second variable resistor 305b. The voltage generated across the first variable resistor R1 305a and the second variable resistor 305b is provided as input to the mixer circuit 317. The resistance offered by the first variable resistor R1 305a and the second variable resistor 305b is controlled by an AGC (automatic gain control) to meet the signal swing constraint across the variable resistors R1 and R2. The mixer 317 downconverts the voltage provided as input and generates an output voltage that is provided to the detector 306 through the path 318. The electronic communication device 300 works in the voltage sense mode and never switches back and forth between voltage sense mode and current sense mode. Thus, deadzone is avoided since single path is used for RF signal detection and the use of two separate paths (differential voltage sense path and current sense path) is avoided. Also, the RF signal is detected before it is being corrupted by the power harvest circuit 314, thus the electronic communication device 300 provides improved sensitivity and low noise. When current generated at the tag pins 303a and 303b is equal to the current required by the power harvest circuit 314, there is voltage available at the mixer circuit 317 that is used for RF signal detection at the detector 306. This improves the sensitivity of the electronic communication device 300. This is further illustrated and explained as response curve B in FIG. 4 later in the specification FIG. 4 illustrates the response of the electronic communication device 100 according to an example embodiment and of the electronic communication device 300 according to an example embodiment, to the incident radio frequency (RF) signal/RF field. It can be seen in response curve A that the electronic communication device 100 initially works in voltage sense mode when incident RF field in range from 0.1 A/m to 1.9 A/m. As the RF field increases, the electronic communication device 100 switches from the voltage sense mode to the current sense mode. However, in the intermediate RF field range from 1.9 A/m to 4.2 A/m, the RF field in enough to saturate the differential voltage sense path but not enough for the detection across the current sense path as the current through the current sense path has just build-up. This causes a deadzone in the reception and hence a significant increase in bit error rate (BER) in the intermediate RF field range. Thereafter, the electronic communication device 100 works in the current sense mode when the incident RF field is more than 4.2 A/m. The problem of deadzone is avoided in the electronic communication device 300. It can be seen in response curve B that from the start of the incident RF field, the packet reception probability is 100% and it remains constant through the RF field range. The electronic communication device 300 operates in voltage sense mode at all RF signal levels (RF field range). There is no switching from voltage sense mode to current sense mode or vice-versa in electronic communication device 300, thus avoiding the issue of deadzone.

Figure 5:
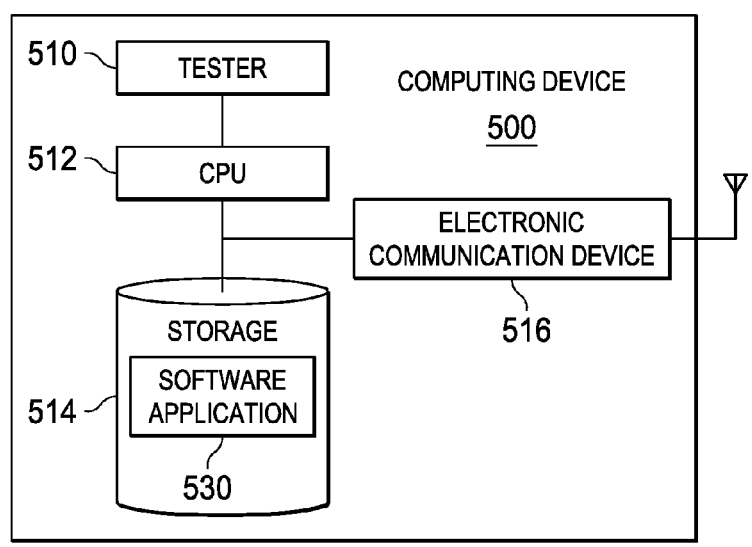
FIG. 5 illustrates a computing device using the electronic communication device illustrated in FIG. 3, according to an embodiment.

FIG. 5 illustrates a computing device according to an embodiment. The computing device 500 is, or is incorporated into, a mobile communication device, such as a mobile phone, a personal digital assistant, a personal computer, or any other type of electronic system. In some embodiments, the computing device 500 includes a megacell or a system-on-chip (SoC) which includes control logic such as a CPU 512 (Central Processing Unit), a storage 514 (e.g., random access memory (RAM)) and a tester 510. The CPU 512 can be, for example, a CISC-type (Complex Instruction Set Computer) CPU, RISC-type CPU (Reduced Instruction Set Computer), processor or a digital signal processor (DSP). The storage 514 (which can be memory such as RAM, flash memory, or disk storage) is a memory module stores one or more software applications 530 (e.g., embedded applications) that, when executed by the CPU 512, perform any suitable function associated with the computing device 500. The tester 510 comprises logic that supports testing and debugging of the computing device 500 executing the software application 530. For example, the tester 510 can be used to emulate a defective or unavailable component(s) of the computing device 500 to allow verification of how the component(s), were it actually present on the computing device 500, would perform in various situations (e.g., how the component(s) would interact with the software application 530). In this way, the software application 530 can be debugged in an environment which resembles post-production operation.

The CPU 512 typically comprises memory and logic which store information frequently accessed from the storage 514. The computing device 500 includes an electronic communication device 516 which is used for communication with neighboring field devices. The electronic communication device 516 is analogous to the electronic communication device 300 in connections and operation. The electronic communication device 516 has high sensitivity because there is voltage available for RF signal detection at all times during RF signal reception. Also, problem of deadzone is avoided as electronic communication device 516 always works in the voltage sense mode and never switches back and forth between voltage sense mode and current sense mode. In addition, the electronic communication device 516 offer low noise as the RF signal is detected before it is being corrupted by other electronic communication device components.

In the foregoing discussion, the terms "connected" means at least either a direct electrical connection between the devices connected or an indirect connection through one or more passive intermediary devices. The term "circuit" means at least either a single component or a multiplicity of passive components, that are connected together to provide a desired function. The term "signal" means at least one current, voltage, charge, data, or other signal. Also, the terms "coupled to" or "couples with" (and the like) are intended to describe either an indirect or direct electrical connection. Thus, if a first device is coupled to a second device, that connection can be through a direct electrical connection, or through an indirect electrical connection via other devices and connections.

The foregoing description sets forth numerous specific details to convey a thorough understanding of the invention. However, it will be apparent to one skilled in the art that the invention may be practiced without these specific details. Well-known features are sometimes not described in detail in order to avoid obscuring the invention. Other variations and embodiments are possible in light of above teachings, and it is thus intended that the scope of invention not be limited by this Detailed Description, but only by the following Claims.

What is claimed is:

1. A method of detecting an RF (radio frequency) signal in an NFC (near field communication) device comprising:
   receiving the RF signal;
   generating a differential current signal from the RF signal;
   generating a differential voltage from the differential current signal;
   downconverting the differential voltage to generate an output voltage; and
   detecting the RF signal from the output voltage.

2. The method of claim 1 further comprising providing the RF signal to an antenna in the NFC device to generate the differential current signal, the differential current signal is generated at a first tag pin and a second tag pin in the NFC device.

3. The method of claim 1 further comprising providing the differential current signal to a first variable resistor and a second variable resistor to generate the differential voltage, the first variable resistor and the second variable resistor are coupled to the first tag pin and the second tag pin respectively.

4. The method of claim 1 further comprising providing the differential voltage to a mixer circuit, the mixer circuit configured to downconvert the differential voltage to generate the output voltage.

5. The method of claim 1, wherein the mixer circuit is a passive mixer.

6. The method of claim 1 further comprising configuring a shunt regulator to protect the NFC device from high field strength of the RF signal.

7. The method of claim 6, wherein protecting the NFC device by configuring the shunt regulator further comprises:
   detecting a peak voltage in the RF signal;
   comparing the peak voltage with a reference voltage by a shunt amplifier; and
   controlling a bias gate voltage of a plurality of shunt NMOS transistors by an output of the shunt amplifier.

8. The method of claim 1 further comprising providing power supply to a digital module, an analog module and the mixer circuit by a power harvest circuit, the power harvest circuit is coupled to the first variable resistor and the second variable resistor.

9. The method of claim 1 further comprising controlling a resistance of the first variable resistor and the second variable resistor by an automatic gain controller (AGC).

10. The method of claim 1 further comprising operating the NFC device in a voltage sense mode at all RF signals levels to avoid deadzone.

11. An electronic communication device comprising:
an antenna configured to receive an RF (radio frequency) signal and generate a differential current signal; and
a mixer circuit configured to downconvert a differential voltage to generate an output voltage, wherein the differential voltage is generated from the differential current signal, and the output voltage is used for detecting the RF signal.

12. The electronic communication device of claim 11, wherein the differential current signal is generated at a first tag pin and a second tag pin in the electronic communication device.

13. The electronic communication device of claim 11 further comprising a first variable resistor and a second variable resistor coupled to the first tag pin and the second tag pin respectively, the differential current signal is provided to the first variable resistor and the second variable resistor to generate the differential voltage.

14. The electronic communication device of claim 11, wherein the mixer circuit is coupled across the first variable resistor and the second variable resistor.

15. The electronic communication device of claim 11 further comprising a shunt regulator coupled to the first variable resistor and the second variable resistor, the shunt regulator configured to protect the electronic communication device from high field strength of the RF signal.

16. The electronic communication device of claim 11, wherein the shunt regulator further comprises:
a peak detector coupled to the first variable resistor and the second variable resistor, and configured to detect a peak voltage in the RF signal;
a shunt amplifier coupled to the peak detector, and configured to compare the peak voltage with a reference voltage; and
a plurality of shunt NMOS transistors coupled to the shunt amplifier, the first variable resistor and the second variable resistor, wherein a bias gate voltage of the plurality of shunt NMOS transistors is controlled by an output of the shunt amplifier.

17. The electronic communication device of claim 11 further comprising a power harvest circuit coupled to the first variable resistor and the second variable resistor, the power harvest circuit configured to provide power supply to a digital module, an analog module and the mixer circuit.

18. The electronic communication device of claim 17, wherein the power harvest circuit is a half wave rectifier.

19. The electronic communication device of claim 11 further comprising a clamp circuit coupled to the first variable resistor and the second variable resistor, the clamp circuit configured to clamp the differential current signal.

20. The electronic communication device of claim 11 is configured to operate in a voltage sense mode at all RF signal levels to avoid deadzone.

* * * * *